United States Patent [19]

Lachowicz

[11] 4,210,217
[45] Jul. 1, 1980

[54] SELF-PROPELLED STEERING DEVICE FOR TRAILERS

[76] Inventor: Eugene Lachowicz, 20129 Rogge, Detroit, Mich. 48234

[21] Appl. No.: 961,406

[22] Filed: Nov. 16, 1978

[51] Int. Cl.² .............................................. B62D 51/04
[52] U.S. Cl. ..................................... 180/13; 180/19 R
[58] Field of Search ................... 180/19 R, 19 S, 19 H, 180/11, 12, 13; 280/3

[56] References Cited

U.S. PATENT DOCUMENTS

| | | | |
|---|---|---|---|
| 2,786,690 | 3/1957 | Tharp | 280/3 |
| 3,439,764 | 4/1969 | Kimball | 180/19 R |
| 3,861,483 | 4/1974 | Pavelka | 180/12 |

Primary Examiner—John A. Pekar
Attorney, Agent, or Firm—Cullen, Sloman, Cantor, Grauer, Scott & Rutherford

[57] ABSTRACT

A self-powered device for maneuvering automobile trailers after they are disconnected from the automobile comprises a coupling sleeve for receiving the lower end of a telescopic jack tube on the trailer, which coupling sleeve is mounted between the front caster wheel of the device and the rear driving wheel. The coupling sleeve socket swivels fore and aft but not side to side to facilitate rolling over uneven surfaces while providing lateral stability. The low height of the coupling sleeve permits connection to the trailer while the trailer is still attached to the automobile.

4 Claims, 2 Drawing Figures

SELF-PROPELLED STEERING DEVICE FOR TRAILERS

BACKGROUND OF THE INVENTION

The environment of the present invention presents a trailer hitched to an automobile which must be moved to a position in a parking or storing area inaccessible to the automobile. Many times in order to move the few feet necessary to finally position the trailer, a great amount of effort is necessary and often requires two or more able-bodied persons to physically lift the trailer off the ball socket of the automobile and move the trailer to its final storage location.

Previously available devices for maneuvering trailers have not been entirely satisfactory. For example, the device disclosed in the U.S. Pat. No. 3,861,483 to Pavelka requires two side-by-side powered wheels plus two casters for stability, because the ball connection to the ball socket type hitch of the trailer does not provide stability against tipping in either the fore and aft or the lateral direction. The two powered wheels require a costly differential gear to avoid excessive difficulty in turning which would otherwise result from tire scrubbing inherent in such an arrangement. Because the device connects to the hitch of the trailer, it cannot be connected until the trailer is disconnected from the towing hitch on the car.

The Kimball U.S. Pat. No. 3,439,764, employs a single driving wheel directly under the load, with no casters or auxiliary wheels to aid in distributing the load. Auxiliary wheels are used only when the device is detached from the trailer, and then are used to elevate the driving wheel off the ground. Because only a single wheel carries the trailer load, the socket which receives the tube of the trailer jack must be rigid for stability, making it more difficult to traverse uneven terrain. Another disadvantage is the placement of the socket over the drive wheel, a position which increase its height and may require the trailer tongue to be lifted off the towing hitch on the car in order to permit the device to roll in under the jack tube.

The U.S. Pat. Nos. to Holtzclaw et al (3,370,666), Jacobs (3,123,173), Bueckner (3,865,204), Hawgood (3,156,315), Peckham (3,356,172) and Shields et al (3,942,823) show other examples of trailer moving devices employing similar concepts with either two or more laterally spaced wheels or with the load of the trailer being directly over one of the wheels being driven. They present similar problems of stability, maneuverability, convenience and cost.

SUMMARY OF THE INVENTION

The trailer moving device of the present invention has a single rear wheel drive and a single front caster. A sleeve socket, located between the rear driving wheel and the front caster, receives the telescoping tube of the trailer jack. The socket is able to be pivoted in a fore and aft vertical plane corresponding to the plane of the drive wheel but not in the transverse vertical plane.

In a preferred embodiment, the socket is located low enough so that a trailer may be attached without first removing the trailer from the automobile. This is possible because the receiving socket is designed not to receive the ball hitch which is used to attach to the automobile but is instead designed to receive the telescopic jack which is rearwardly located from the front of the tongue of the trailer. Therefore, the trailer may be attached to the moving mechanism while still attached to the automobile, thus negating any need for the operator to lift the trailer tongue off the automobile hitch prior to engaging the trailer moving device. The use of a single drive wheel not only reduces the cost of the vehicle but enables the operator to turn the moving device in a desired direction with a minimum of tire scrubbing on the ground.

The placement of the load between the rear drive wheel and the front caster wheel adds stability to the mechanism thus assuring that the weight of the trailer will not cause the device to tip forward or backward when moving the vehicle over a rough surface. This is an improvement over previous devices in that the load over the front wheel presented a precarious balance which was a hazard if the front wheel hit a bump or dip during the transportation of the trailer. This instability was particularly dangerous as the handle of prior art devices could be thrown forward, damaging the trailer or injuring the operator or bystander. The socket design further facilitates rolling over uneven surfaces by allowing pivoting fore and aft in a vertical plane. This permits the trailer load to maintain a substantially stable or level position while the moving device traverses a rough surface.

The present invention presents a safe, easy to turn, inexpensive self-propelled trailer moving device designed without need for laterally spaced wheels and which may be attached to the trailer while the trailer is still attached to the automobile.

DETAILED DESCRIPTION

Figure 1:
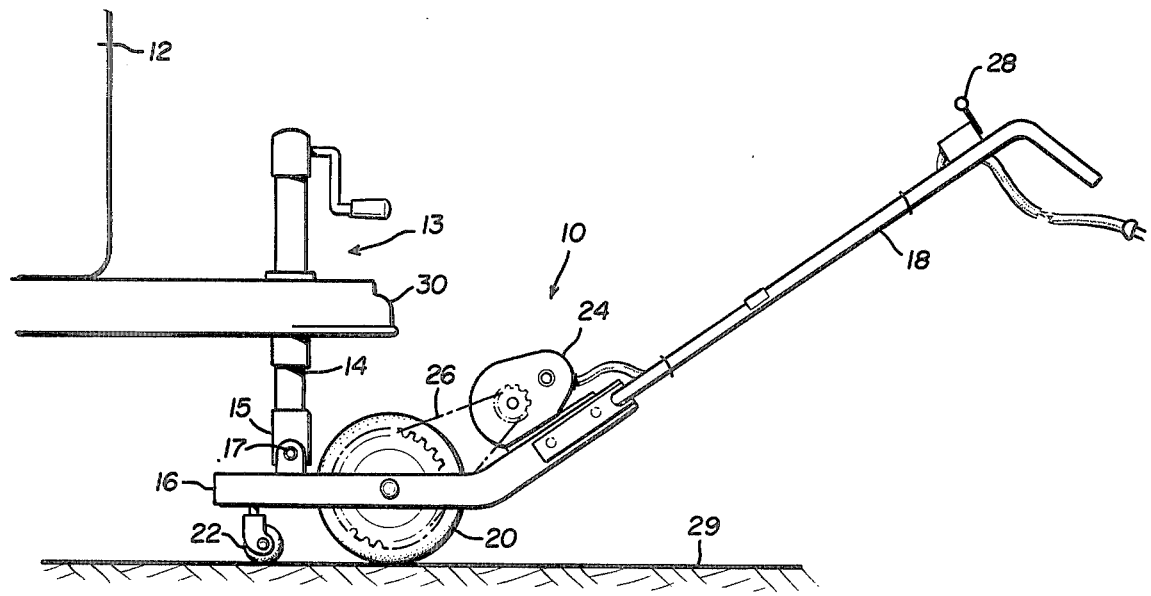
FIG. 1 is a side view of the trailer moving device of the present invention.

FIG. 1 shows the trailer moving device 10 connected to a trailer structure 12 which may be any size normally requiring a mechanical force to move from one position to another. The trailer moving device 10 may be connected to the conventional tongue member 13 and telescopic jack 14 by means of a socket 15 which is pivotally attached to the metal frame structure 16 of the trailer moving device by means of a hinge member 17 and which receives the lower end of jack 14. Attached to the frame member 16 is the handle assembly 18 which, although shown as a two-piece structure in FIG. 2, may be of any desired type for turning the trailer moving device 10. The driving wheel 20 is rotatably mounted on a fixed axis transverse to the frame structure 16 and is located rearward of the socket member 15. Forwardly located in the frame structure 16 is a caster wheel 22 which acts as a rolling support for the load of the trailer while at the same time being easily directed to turn in the direction required by the operator. This ensures that the operator in the most difficult situation, a tight turn from a stationary condition, will only have to provide enough force to scrub the drive wheel 20 across the surface without having to apply additional force to move the caster wheel 22, which provides no opposition to the change of direction.

Drive for the trailer moving device 10 is provided by an electric motor 24 and drive belt 26 which are used to turn the drive wheel 20. Controls for the electric motor and drive means are provided by conventional drive engaging controls 28 located on the upper part of the handles 18. These controls preferably include on-off, neutral, forward and reverse settings. An electric cord is adapted to be connected to a 110 volt source at the owner's home, campsite, etc.

As best seen in FIG. 1, the device is constructed so that the upper end of socket 15 is close to the ground, so that it can be readily rolled into position beneath tube 14 while the tongue 13 and ball socket 30 are still connected to the ball hitch on the car. Jack 14 may normally have a caster wheel of its own at its lower end, which would first be removed and the jack raised to facilitate this operation. Thereafter, the jack can again be extended to lift the socket 30 off the ball hitch of the car. Then the trailer moving device can be directed by scrubbing the drive wheel 20 along the surface to point the handles and drive wheel in the direction of travel desired for final location of the trailer.

The use of only one drive wheel permits the scrubbing, which is necessary to redirect the direction of travel, to be accomplished with a minimum of force, as well as a savings in cost of construction of the device. The location of the socket 15 between the front caster wheel and the rear drive wheel positions the load of the trailer at a point which is stable to prevent tipping of the trailer moving device 10. The ease of movement of the trailer and the side to side stability is further enhanced by the construction of the socket 15 in conjunction with the trailer frame 16 as is presently discussed in conjunction with FIG. 2.

Figure 2:
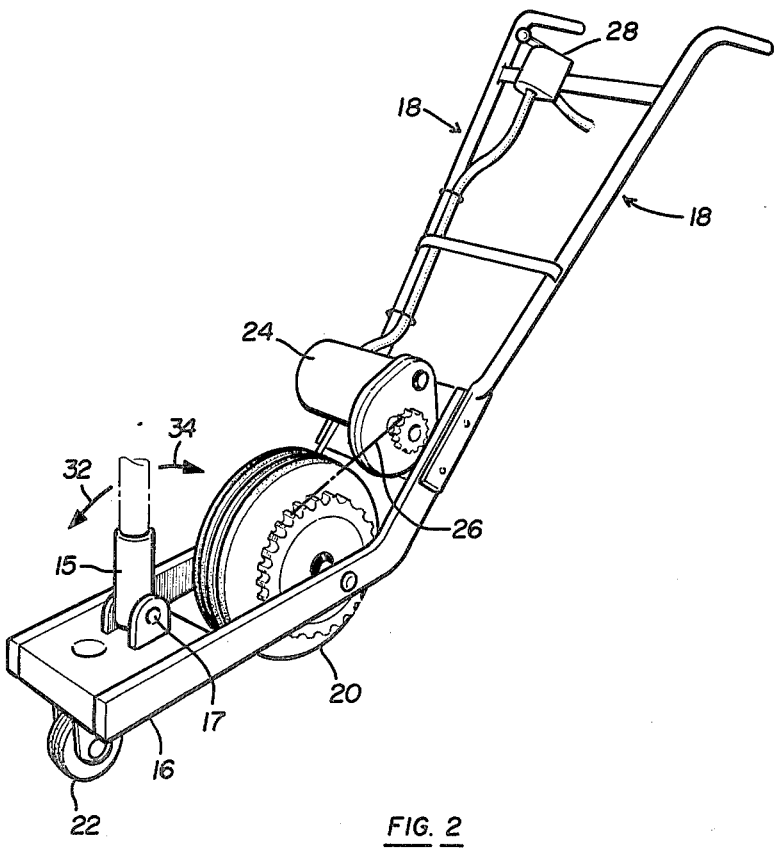
FIG. 2 is a perspective view of the trailer moving device of the present invention.

FIG. 2 details the socket attachment to the frame 16 of the trailer moving device 10 wherein the socket is permitted to move several degrees fore and aft in the vertical plane corresponding to the plane of the drive wheel 20 by means of the hinge pin connection which is parallel to the axis of wheel 20. The direction of permitted movement is indicated by arrows 32 and 34. This construction feature allows limited relative movement between the telescoping jack 14 and frame 16 in the defined vertical plane when the trailer moving device 10 passes over a bump or other irregularity in the surface during the movement of the trailer. This particular feature, when combined with the positioning of the load bearing member in the socket 15 between the front caster wheel 22 and the rear drive wheel 20, permits the trailer to be moved over irregular surfaces with ease. A further positioning design feature of the trailer will also be noticed from FIG. 2 wherein the hinge pin 17 and the general construction of the socket 30 do not allow for any movement in the vertical plane transverse to the plane indicated by the arrows 32 and 34. This design feature permits use of a single wheel drive means and a single caster by eliminating the need for laterally offset wheels at either position because the inherent lateral stability of the trailer as well as the limited hinge socket movement prevents the trailer from tipping or becoming otherwise unbalanced during transportation.

It will be understood that various changes and modifications may be made from the foregoing without departing from the spirit and scope of the appended claims.

I claim:

1. An apparatus for attaching to and maneuvering a trailer having a telescopic jack support mounted on the tongue of the trailer comprising:
    frame means;
    a single driving wheel;
    drive means operatively connected to said driving wheel for selectively causing said wheel to rotate;
    a handle mounted on said frame means in tandem relationship with said driving wheel;
    a single caster wheel located on the opposite side of said driving wheel from said handle and adapted to carry part of the weight of a trailer when the apparatus is attached thereto;
    socket means located on said frame means between said drive wheel and said caster wheel, said socket means being pivotally mounted on said frame means for pivotal movement in a vertical plane about an axis parallel to the rotational axis of said drive wheel while being restricted against lateral movement in the vertical plane parallel to said drive wheel axis.

2. Apparatus according to claim 1 wherein said drive means is an electric motor located on said frame.

3. Apparatus according to claim 1 wherein said socket means comprises an open-ended tube for receiving said telescoping jack located on the trailer tongue of said trailer to be moved.

4. Apparatus according to claim 3 wherein said socket means is located below the normal height of said trailer tongue when said trailer tongue is attached to an automobile.

* * * * *